US010121234B2

(12) United States Patent
Cao et al.

(10) Patent No.: US 10,121,234 B2
(45) Date of Patent: Nov. 6, 2018

(54) SYSTEM AND METHOD FOR GHOST REMOVAL IN VIDEO FOOTAGE USING OBJECT BOUNDING BOXES

(71) Applicant: HRL Laboratories, LLC, Malibu, CA (US)

(72) Inventors: Yongqiang Cao, Newton, MA (US); Narayan Srinivasa, Portland, OR (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 15/481,220

(22) Filed: Apr. 6, 2017

(65) Prior Publication Data

US 2017/0316555 A1 Nov. 2, 2017

Related U.S. Application Data (60) Provisional application No. 62/319,076, filed on Apr. 6, 2016.

(51) Int. Cl.
*G06K 9/00* (2006.01)
*G06T 5/50* (2006.01)

(52) U.S. Cl.
CPC ...... *G06T 5/50* (2013.01); *G06T 2207/10016* (2013.01); *G06T 2207/20021* (2013.01); *G06T 2207/20224* (2013.01)

(58) Field of Classification Search
None
See application file for complete search history.

(56) References Cited

U.S. PATENT DOCUMENTS

| 8,131,011 | B2 * | 3/2012 | Nevatia | G06K 9/00369 |
| | | | | 382/103 |
| 2003/0235327 | A1 * | 12/2003 | Srinivasa | G06K 9/3241 |
| | | | | 382/104 |
| 2004/0131254 | A1 | 7/2004 | Liang et al. | |
| 2005/0063565 | A1 * | 3/2005 | Nagaoka | B60R 21/013 |
| | | | | 382/104 |

(Continued)

FOREIGN PATENT DOCUMENTS

KR    101548455    8/2015

OTHER PUBLICATIONS

Real-time ghost removal for foreground segmentation methods Dimitrios Makris et al., Research gate, 2008, pp. 1-8.*

(Continued)

*Primary Examiner* — Jayesh A Patel
(74) *Attorney, Agent, or Firm* — Tope-McKay & Associates (57) ABSTRACT

Described is a system for ghost removal in video footage. During operation, the system generates a background subtraction map and an original bounding box that surrounds a detected foreground object through background subtraction. A detected foreground map is then generated. The detected foreground map includes at least two detected foreground (DF) bounding boxes of detected foregrounds obtained by a difference of two consecutive frames in video footage. Further, the original bounding box is then trimmed into a trimmed box, the trimmed box being a smallest box that contains the at least two DF bounding boxes. The trimmed box is designated as containing a real-world object, which can then be used for object tracking.

26 Claims, 10 Drawing Sheets

(56) References Cited

U.S. PATENT DOCUMENTS

| | | | |
|---|---|---|---|
| 2009/0041297 A1* | 2/2009 | Zhang | G06K 9/00362 382/103 |
| 2011/0176727 A1 | 7/2011 | Kataoka | |
| 2013/0039409 A1* | 2/2013 | Gupta | G06K 9/00771 375/240.02 |
| 2014/0254863 A1* | 9/2014 | Marks | G06K 9/00771 382/103 |

OTHER PUBLICATIONS

Notification of Transmittal of International Search Report and the Written Opinion of the International Searching Authority for PCT/US2017/026425; dated Jul. 20, 2017.

International Search Report of the International Searching Authority for PCT/US2017/026425; dated Jul. 20, 2017.

Written Opinion of the International Searching Authority for PCT/US2017/026425; dated Jul. 20, 2017.

Stauffer, Chris, and W. Eric L. Grimson. "Adaptive background mixture models for real-time tracking." In Computer Vision and Pattern Recognition, 1999. IEEE Computer Society Conference on. vol. 2. IEEE, 1999, pp. 246-252.

Lim, Jongwoo, and Bohyung Han. "Generalized background subtraction using superpixels with label integrated motion estimation." In Computer Vision—ECCV 2014, pp. 173-187. Springer International Publishing, 2014.

Sheikh, Yaser, Omar Javed, and Takeo Kanade. "Background subtraction for freely moving cameras." In Computer Vision, 2009 IEEE 12th International Conference on, pp. 1219-1225. IEEE, 2009.

Cucchiara, Rita, Costantino Grana, Massimo Piccardi, and Andrea Prati. "Detecting moving objects, ghosts, and shadows in video streams." Pattern Analysis and Machine Intelligence, IEEE Transactions on 25, No. 10 (2003): pp. 1337-1342.

Kadim, Zulaikha, Kim Meng Liang, Norshuhada Samudin, Khairunnisa M. Johari, and Hock Woon Hon. "Ghost removal for background subtraction using color similarity comparison." In Fourth International Conference on Machine Vision (ICMV 11), pp. 83490P-83490P. International Society for Optics and Photonics, 2012.

\* cited by examiner

SYSTEM AND METHOD FOR GHOST REMOVAL IN VIDEO FOOTAGE USING OBJECT BOUNDING BOXES

GOVERNMENT RIGHTS

This invention was made with government support under U.S. Government UPSIDE contract, Contract Number HR0011-13-C-0052. The government has certain rights in the invention.

CROSS-REFERENCE TO RELATED APPLICATIONS

This is a non-provisional patent application of 62/319,076, filed on Apr. 6, 2016, the entirety of which is hereby incorporated by reference.

BACKGROUND OF INVENTION

(1) Field of Invention

The present invention relates to a system and method for ghost removal in video footage and, more specifically, to one that achieves high efficiency and robustness in effectively distinguishing between the video's background and the foreground information presented within object bounding boxes.

(2) Description of Related Art

Detecting moving objects in video footage is often performed using background subtraction. Background subtraction is a well-known method in the art in which the background is subtracted from the video, leaving foreground objects (i.e., the detected moving objects) (see the List of Incorporated Literature References, Reference Nos. 1, 2, and 3). However, a common problem with background subtraction is creating ghost objects. A ghost object is a detected false foreground object that doesn't correspond to any real object. For example, when a stationary object in the background suddenly starts to move, using background subtraction will create a ghost object behind the real object. The problem becomes more severe when the camera is moving, since a moving camera will bring a lot of new objects into the scene (e.g., in a helicopter video). Some methods have been suggested to remove ghost objects (see Literature Reference Nos. 4 and 5). Most of these prior art methods rely upon appearance or color information to remove the ghosts, in which it is assumed that a ghost object is separate from a real object. Where this is in fact the case, the ghosting artifact created is known in the art as a Type I ghost. However, when an object is moving slowly, a ghost object attached to the real object can be created, known in the art as a Type II ghost. In a real image with a noisy background, it can be hard to remove this type of ghost based on only the color information.

These existing ghost removal methods are sensitive to object and background noise, which puts them at a distinctive disadvantage in terms of their ability to perform their intended function without forming ghost objects. Such prior art methods compare the appearance or color statistics of ghost objects and their surroundings to remove the ghost objects. As noted above, these methods are sensitive to object and background texture and noise, which is common in video footage.

Thus, a continuing need exists for a system for ghost removal in video footage that avoids the abovementioned pitfalls of traditional prior art. Specifically, a need exits for ghost removal that is largely unaffected by object and background texture and noise.

SUMMARY OF INVENTION

This disclosure provides a system for ghost removal in video footage. The system, for example, includes one or more processors and a memory. The memory is a non-transitory computer-readable medium having executable instructions encoded thereon, such that upon execution of the instructions, the one or more processors perform several operations, such as generating a background subtraction map; generating an original bounding box that surrounds a detected foreground object through background subtraction; generating a detected foreground map, the detected foreground map having at least two detected foreground (DF) bounding boxes of detected foregrounds obtained by a difference of two consecutive frames in video footage; and trimming the original bounding box into a trimmed box, the trimmed box being a smallest box that contains the at least two DF bounding boxes, wherein the trimmed box is designated as containing a real-world object.

In another aspect, the system performs an operation of tracking the real-world object through successive image frames based on the trimmed box.

In yet another aspect, the background subtraction map is obtained from a difference between a current image frame and a model background map.

In another aspect, the model background map is initialized from an initial image frame and thereafter updated with a weighted combination of a former model background map and the current image, wherein regions of the current image corresponding to interiors of trimmed boxes in the detected foreground map are provided a weighting in this combination that is less than regions outside the trimmed boxes.

In yet another aspect, the video footage is obtained from a moving camera, causing new regions of a scene to come into the current image with each frame, wherein the model background map is shifted in accord with a determined camera ego-motion to generate a shifted model background map, and then any regions of the shifted model background map that contain no information are replaced with pixel values from the current image.

Additionally, each frame in the video footage has a frame size, and wherein the model background map is an expanded model background map that is a larger size than the frame size of the video footage, such that portions of the expanded model background map that are outside the frame when the model background map is updated are provided a reduced weighting in accord with a number of frames for which they are not updated, and wherein portions of the expanded model background map that are shifted into the frame in accord with ego-motion are combined with the current image in accord with this weighting.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a system and method for ghost removal in video footage and, more specifically, to one that achieves high efficiency and robustness in effectively distinguishing between the video's background and the foreground information presented within object bounding boxes. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of incorporated literature references is provided. Next, a description of the various principal aspects of the present invention is provided. Subsequently, an introduction provides the reader with a general understanding of the present invention. Finally, specific details of various aspects of the present invention are provided to give an understanding of the specific aspects.

(1) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number.

1. Stauffer, Chris, and W. Eric L. Grimson. "Adaptive background mixture models for real-time tracking." In Computer Vision and Pattern Recognition, 1999. IEEE Computer Society Conference on. vol. 2. IEEE, 1999.
2. Lim, Jongwoo, and Bohyung Han. "Generalized background subtraction using superpixels with label integrated motion estimation." In Computer Vision-ECCV 2014, pp. 173-187. Springer International Publishing, 2014.
3. Sheikh, Yaser, Omar Javed, and Takeo Kanade. "Background subtraction for freely moving cameras." In Computer Vision, 2009 IEEE 12th International Conference on, pp. 1219-1225. IEEE, 2009.
4. Cucchiara, Rita, Costantino Grana, Massimo Piccardi, and Andrea Prati. "Detecting moving objects, ghosts, and shadows in video streams." Pattern Analysis and Machine Intelligence, IEEE Transactions on 25, no. 10 (2003): 1337-1342.
5. Kadim, Zulaikha, Kim Meng Liang, Norshuhada Samudin, Khairunnisa M. Johari, and Hock Woon Hon. "Ghost removal for background subtraction using color similarity comparison." In Fourth International Conference on Machine Vision (ICMV 11), pp. 83490P-83490P. International Society for Optics and Photonics, 2012.

(2) Principal Aspects

Various embodiments of the invention include three "principal" aspects. The first is a system for ghost removal in video footage. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
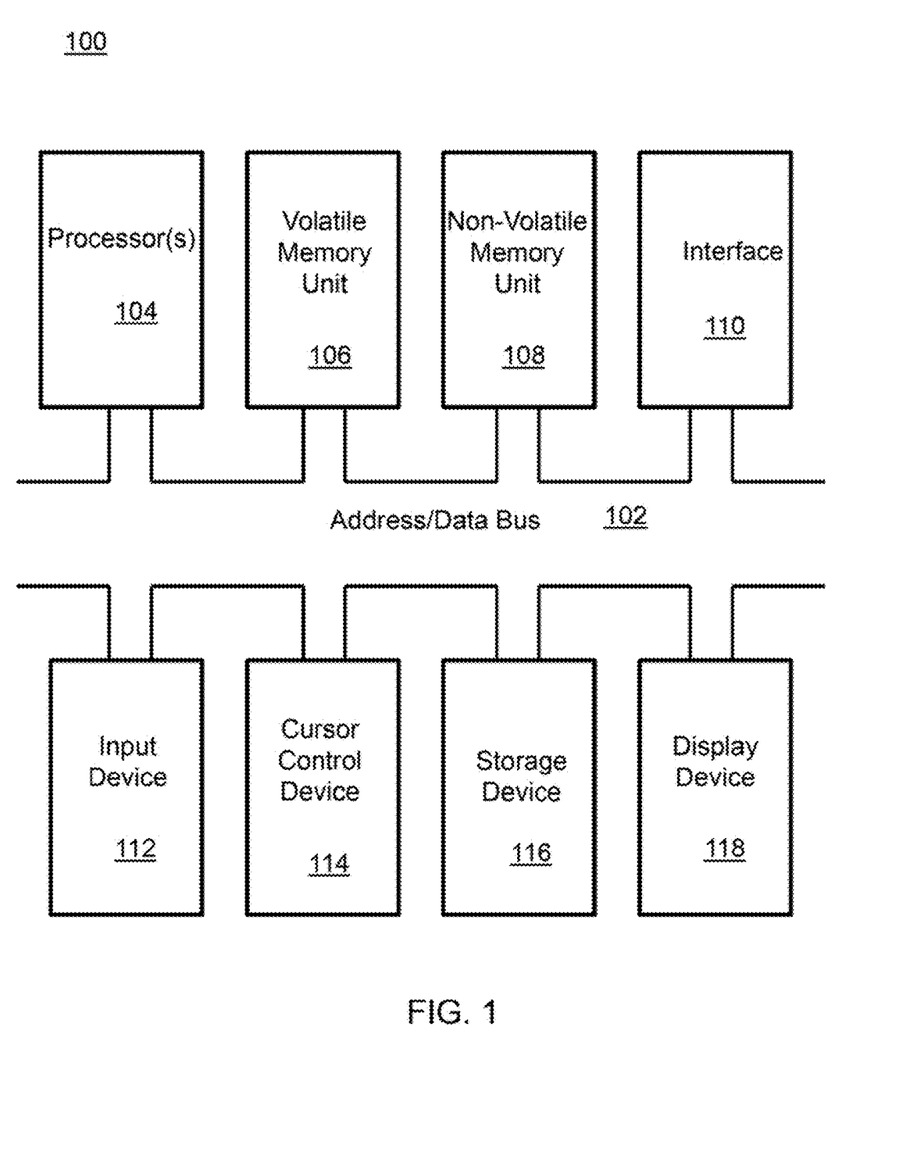
FIG. 1 is a block diagram depicting the components of a system according to various embodiments of the present invention.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
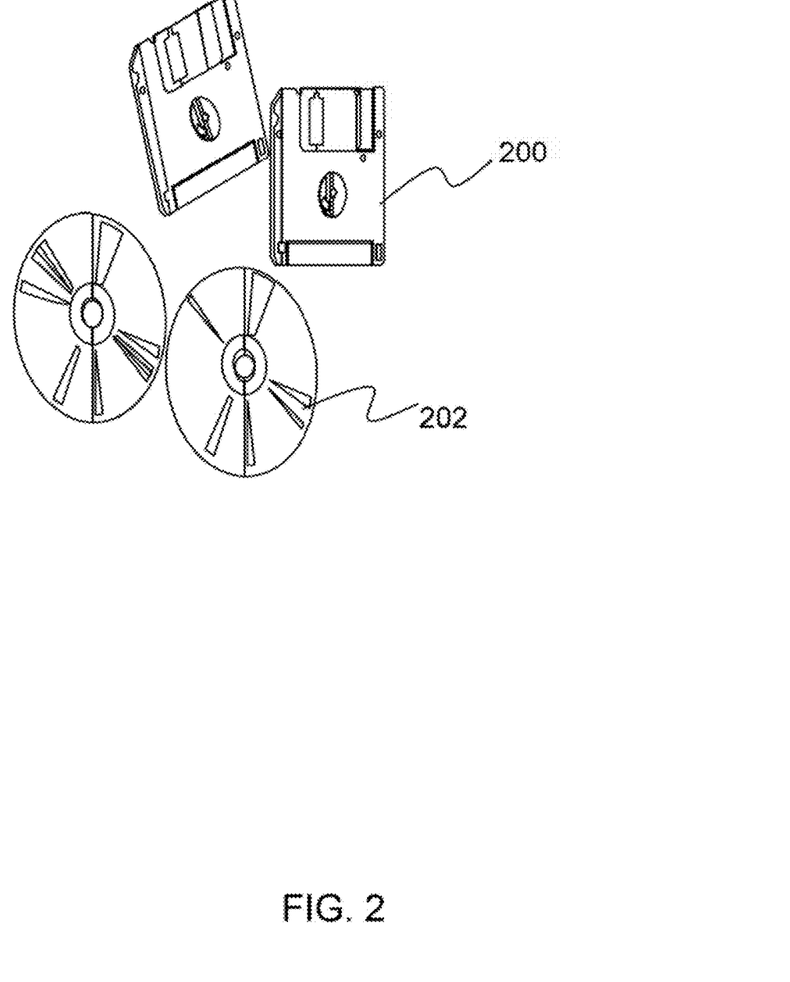
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

This disclosure introduces a unique process for ghost removal in background subtraction models for moving object detection in videos. Background subtraction is a well-known method in the art for moving object detection in videos. However, a common problem with background subtraction lies in its propensity to create ghost objects (false non-existing objects). One way of dealing with this issue lies in the employment of any of a number of ghost removal methods. Most of these prior art methods rely upon appearance or color information to remove the ghosts, in which it is assumed that a ghost object is separate from a real object. Where this is in fact the case, the ghosting artifact created is known in the art as a Type I ghost. However, when an object is moving slowly, a ghost object attached to the real object can be created, known in the art as a Type II ghost. In a real image with a noisy background, it can be hard to remove this type of ghost based on only the color information.

Figure 3A:
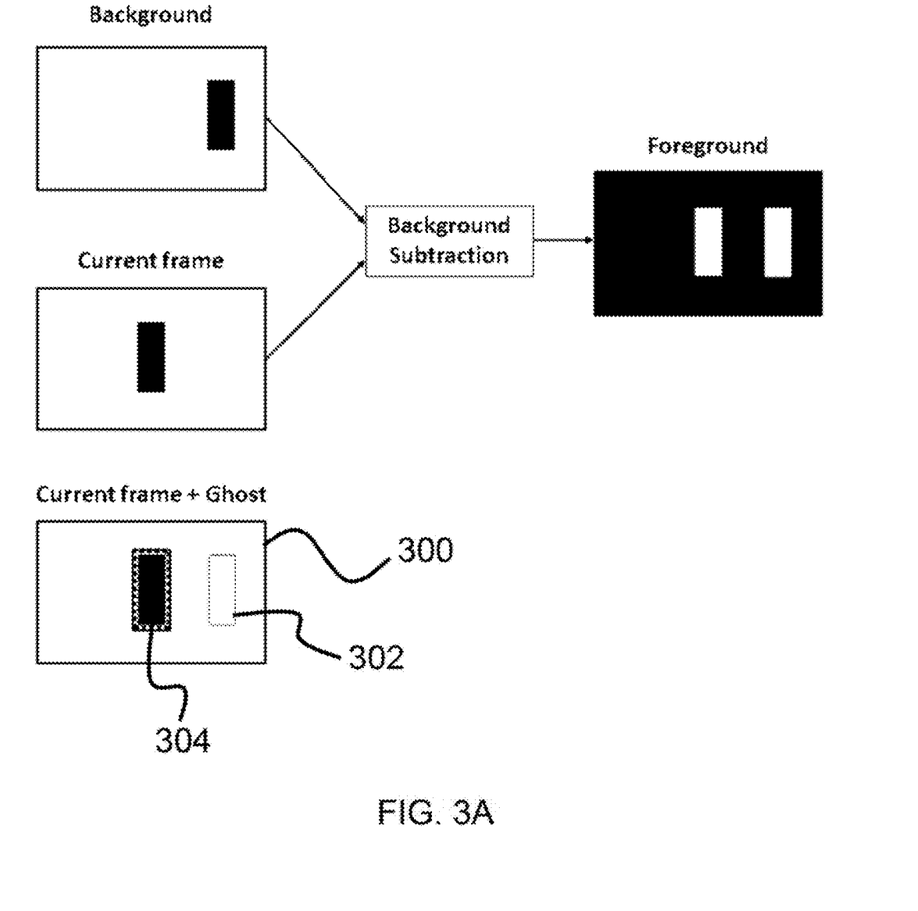
FIG. 3 is an diagram depicting two distinctive types of ghost objects.
Figure 3B:
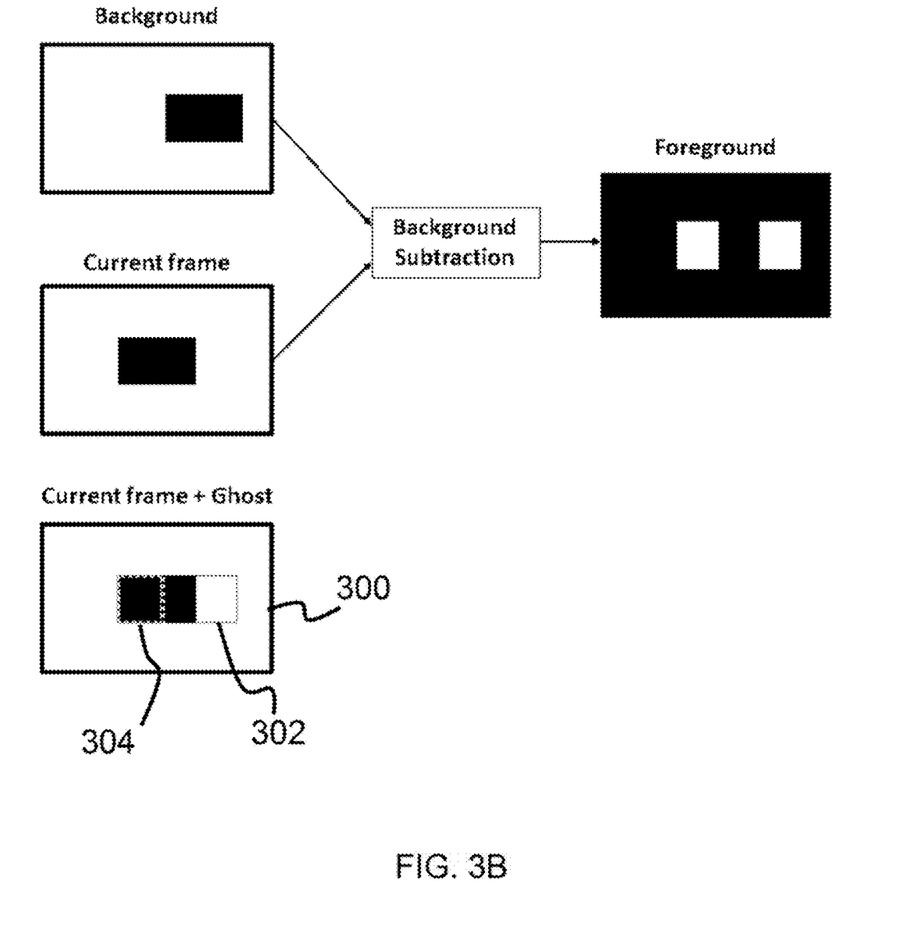

By contrast, the method of this disclosure, referred to as the "box trim method," is efficient and robustly insensitive to noise. The box trim method improves upon the prior art by removing both types of ghosts (i.e., Type I and Type II) efficiently. For further understanding, FIGS. 3A and 3B provide a depiction of two different types of ghost objects. In the Current frame+Ghost plot 300, the white box framed by a solid line denotes the ghost object 302 and the black box framed by a dashed line denotes the detected part of a real object 304 as foreground. FIG. 3A depicts a Type I ghost object 302, where the object (denoted with black bar) is moving fast, such that the ghost 302 is separated from the real object 304. FIG. 3B depicts a Type II ghost object 302, wherein the object 304 is moving slowly, such that the ghost 302 is attached to the real object 304.

The system described herein uses object bounding boxes to surround identified objects. During operation, only information from the object bounding boxes is used, which renders the system efficient and robustly immune to any texture and noise. As can be appreciated by those skilled in the art, the system of the present disclosure can be advantageously employed in any application that uses video imagery for moving object detection and tracking, such as automated vehicles, surveillance, and helicopter videos.

(4) Specific Details of Various Aspects

As noted above, background subtraction is used to remove ghosts in video footage. Although many adaptive background subtraction models have been suggested to deal with various dynamic backgrounds such as wind and lighting changes (see Literature Reference Nos. 1, 2, and 3), a basic background model will be used to describe the system of the present invention. The present invention has the advantage of its being easily embedded within a more complicated background subtraction model, if desired.

(4.1) Background Model

An example of a suitable background model is as follows. Let $I_{ij}(t)$ denote the intensity map of frame t. The model background intensity $B_{ij}(t)$ at position (i,j) and frame t is defined as:

$$B_{ij}(0) = I_{ij}(0), \quad (1)$$

$$B_{ij}(t) = [(1-w)B_{ij}(t-1) + wI_{ij}(t)][1 - F_{ij}(t)] + B_{ij}(t-1)F_{ij}(t). \quad (2)$$

Here w is the weight with $0 \le w \le 1$, $F_{ij}(t)$ denotes whether pixel (i,j) is a foreground pixel, defined by $$F_{ij}(t) = \begin{cases} 1, & \text{if } |I_{ij}(t) - B_{ij}(t-1)| \ge \theta, \\ 0, & \text{Otherwise,} \end{cases} \quad (3)$$

where θ is a positive threshold. Here it is assumed the camera is stationary. The moving camera case will be addressed later. As noted above, this model can create ghost objects. In the next section, the box trim algorithm is introduced to remove ghosts efficiently and robustly.

(4.2) Box Trim Algorithm

Figure 4:
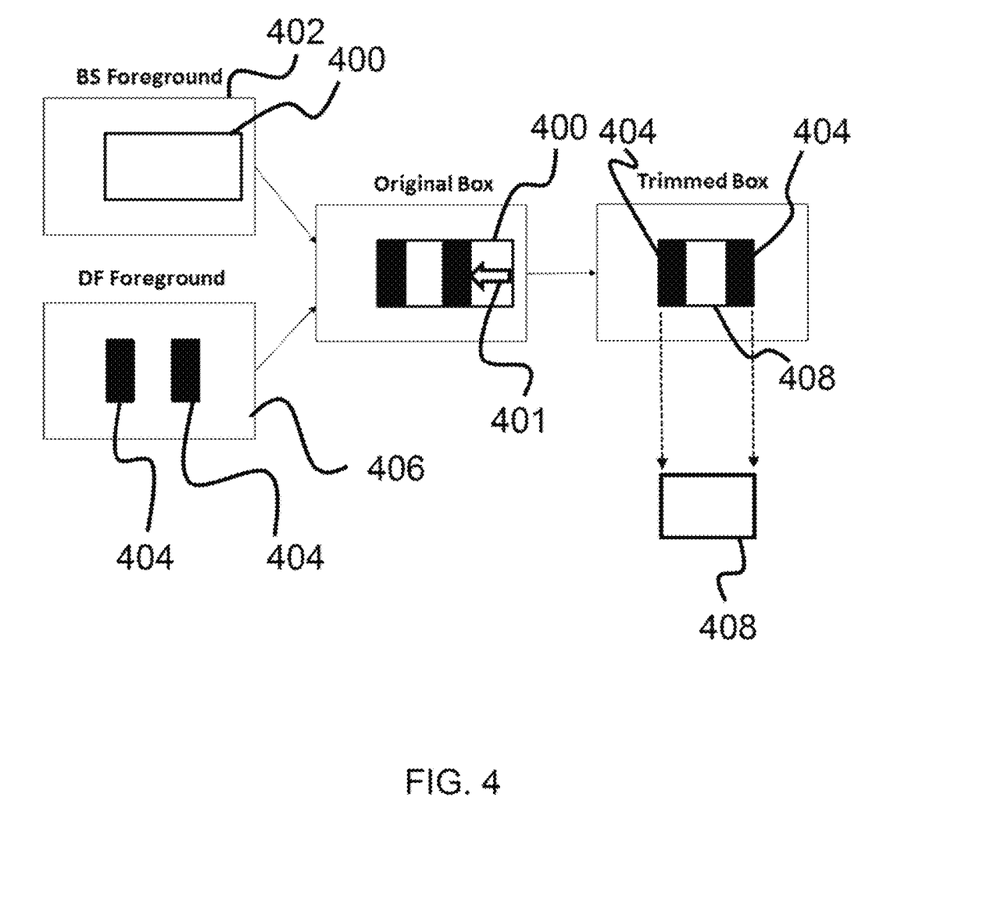
FIG. 4 is an illustration depicting a box trim algorithm according to various embodiments of the present invention.

The box trim Algorithm redefines the foreground in Eq. 3, by adapting to the most recent frames. It removes obsolete foreground pixels including ghosts. For further understanding, FIG. 4 illustrates the concept of the box trim algorithm. For convenience, some notations are first defined as follows:

$$\text{logic}(x) = \begin{cases} 1, & \text{if } x \text{ is true or nonzero,} \\ 0, & \text{if } x \text{ is false or zero.} \end{cases}$$

Denote a rectangular box by a four-tuple $(x_1, y_1, x_2, y_2)$, where $(x_1, y_1)$ is the coordinate of its top-left corner and $(x_2, y_2)$ is the coordinate of its bottom-right corner. Box b' is subset to b if $x'_1 \ge x_1$, $y'_1 \ge y_1$, $x'_2 \le x_2$, and $y'_2 \le y_2$. The bounding box of an object (or a group of connected pixels) is defined as the smallest rectangle that contains all pixels of the object.

As shown in FIG. 4, the black box in the background subtraction (BS) Foreground map 402 denotes the original bounding box 400 of a detected foreground object obtained by background subtraction. The two solid boxes 404 in the detected foreground (DF) Foreground map 406 denote the bounding boxes of detected foregrounds obtained by the difference of two most recent consecutive frames. The box trim algorithm trims 401 the original bounding box 400 into the smallest box 408 that contains the two solid boxes 404.

The process works as follows. Note that the subscript ij is dropped wherever it is unambiguous.

Let B(0)=I(0). For t≥1, repeat:

1. Compute the difference map D of two consecutive frames by $D(t) = \text{logic}(|I(t) - I(t-1)| \ge \theta)$.
2. Compute the background subtraction map S by $S(t) = \text{logic}(|I(t) - B(t-1)| \ge \theta)$.
3. Augment the map S by $S'(t) = S(t) \vee D(t)$, where ∨ is logical OR operator.
4. Generate bounding boxes of map D. Denote it as set $\overline{D}$. Set $\overline{D}$ can have multiple bounding boxes if D has multiple groups of connected pixels.
5. Generate bounding boxes of map S'. Denote it as set $\overline{S}$.
6. For every box b in $\overline{S}$, find all the boxes in $\overline{D}$ that are subset to b. Trim box b to b' such that it is the smallest rectangle that contains all the boxes in D that are subset to b. Remove box b if no box in D is subset to it. Denote the set of trimmed boxes as $\overline{R}$.
7. Let R be a binary image map in which a pixel is 1 if it is inside a box in $\overline{R}$ and 0 otherwise. Then define the foreground map F as $F(t) = S(t) \hat{} R(t)$, where ^ is logical AND operator.
8. Define the model background map B as $B_{ij}(t) = [(1-w)B_{ij}(t-1) + wI_{ij}(t)][1 - F_{ij}(t)] + B_{ij}(t-1)F_{ij}(t)$.

The box trim algorithm removes boxes that do not contain any foreground pixels in map D (difference of two most recent frames), and hence removes the obsolete type I ghosts except those that are in map D. By Step 3, it makes sure that any foreground pixels in map D are included in the augmented background subtraction map. As a result, any box in $\overline{D}$ is subset to a box in $\overline{S}$, and hence real foreground pixels are not removed. For the type II ghosts, it removes any obsolete foreground pixels that are not in map D by trimming the larger boxes tightly. Further, ghost foreground pixels in map D are removed by Step 7 since they are not in map S. This concept is demonstrated in FIG. 5 (which is discussed in further detail below). Notably, the trimmed box is then designated as containing the real object that can be used for a variety of purposes. For example, once ghosts are removed and the trimmed box is designated as containing the real object, the detected real object can then be used for moving object detection and tracking, such as automated vehicles, surveillance, and helicopter videos, etc. For example, the system could then continue by tracking the real-world object through successive image frames based on the trimmed box. Moreover, by virtue of removing most irrelevant background from the original box, it is possible to obtain more accurate object identification results from automated object classification systems, which tend to perform best when they are given images without any extra confounding information in them.

(4.3) Moving Camera

When a camera is moving, it can bring a new image region into the scene in each frame. With the camera ego-motion having been compensated, Equation 2 can be redefined to include the new image region as follows:

$$B_{ij}(t) = \begin{cases} [(1-w)B_{ij}(t-1) + wI_{ij}(t)] \\ [1 - F_{ij}(t)] + B_{ij}(t-1)F_{ij}(t), & \text{if } (i, j) \text{ is old,} \\ I_{ij}(t), & \text{if } (i, j) \text{ is new.} \end{cases} \quad (4)$$

In such situations, it is also possible to keep an expanded model background map that is of a larger size (e.g., in pixels, etc.) than the camera image (i.e., the frame obtained from the video footage). For instance, the model background map can be an expanded model background map that is a larger size (e.g., in pixels, measured dimensions, etc.) than the frame size (e.g., in pixels, measured dimensions, etc.) of the video footage. Thus, when camera ego-motion is detected, regions from previous updates of the background map can be shifted back into the frame of the current view. This less current portion of the model background map may then be merged with the current image with a weighting that is reduced in proportion to the number of frames since that portion of the expanded model background map had been previously updated. The weighting may be provided by a second background count map that decrements a counter for each pixel in the expanded background map that is outside the image frame until the counter reaches zero. The counters for each pixel inside the image frame are reset to their starting value k.

(4.4) Reduction to Practice

Figure 5A:
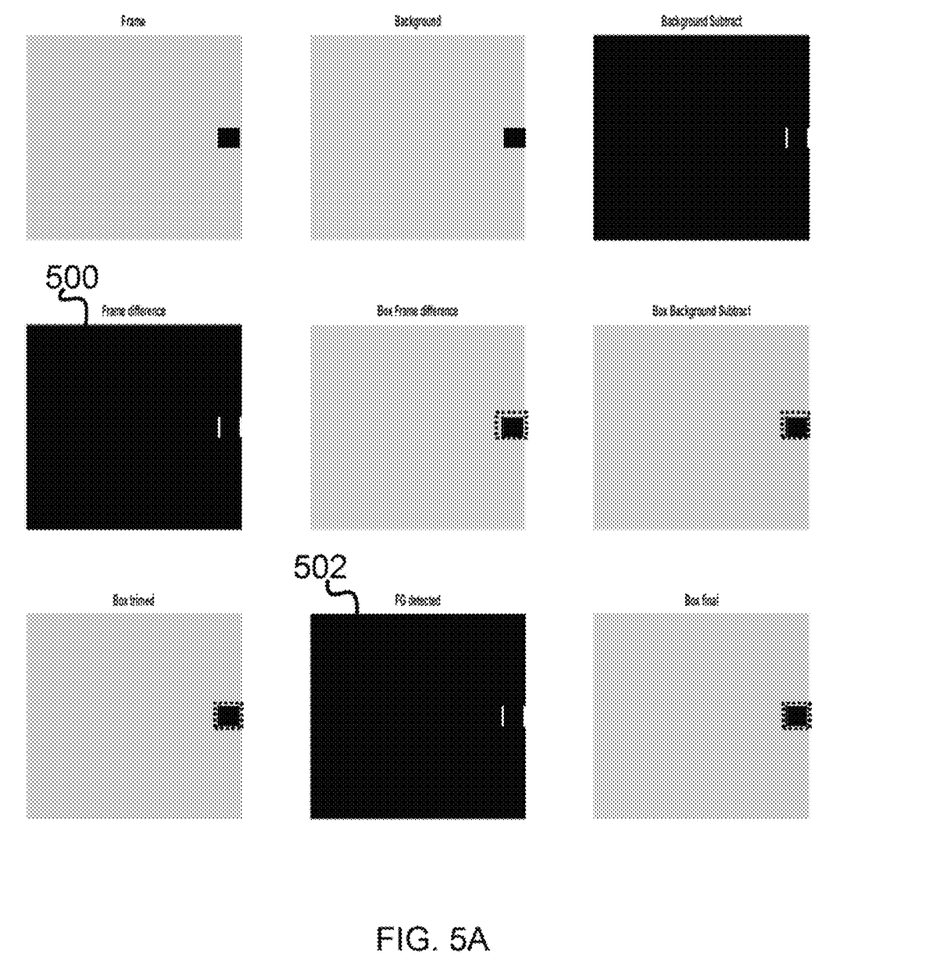
FIG. 5A is an illustration of moving object detection, wherein a black rectangular object is moving toward the left slowly, at a given time lapse of t=1.
Figure 5B:
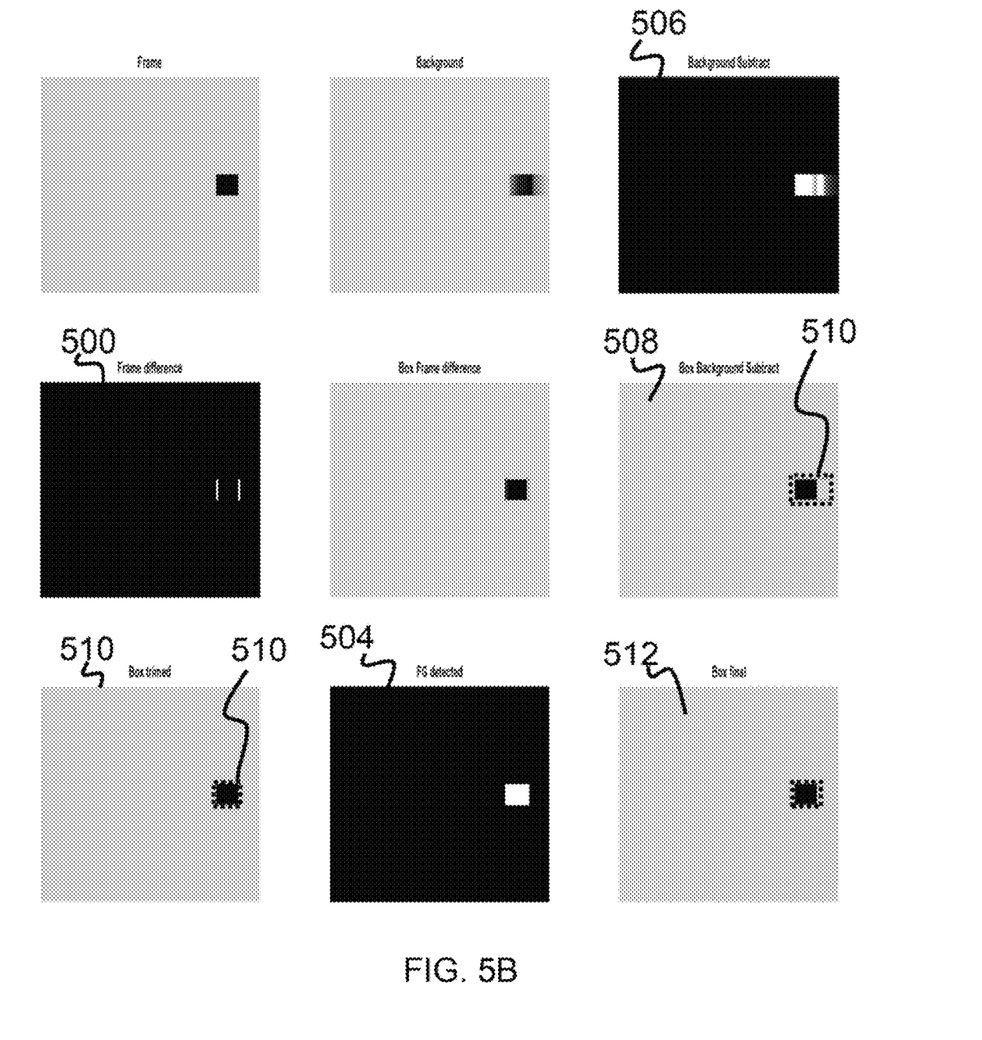
FIG. 5B is an illustration of the same object as shown in FIG. 5A, now at a given time lapse of t=10.
Figure 5C:
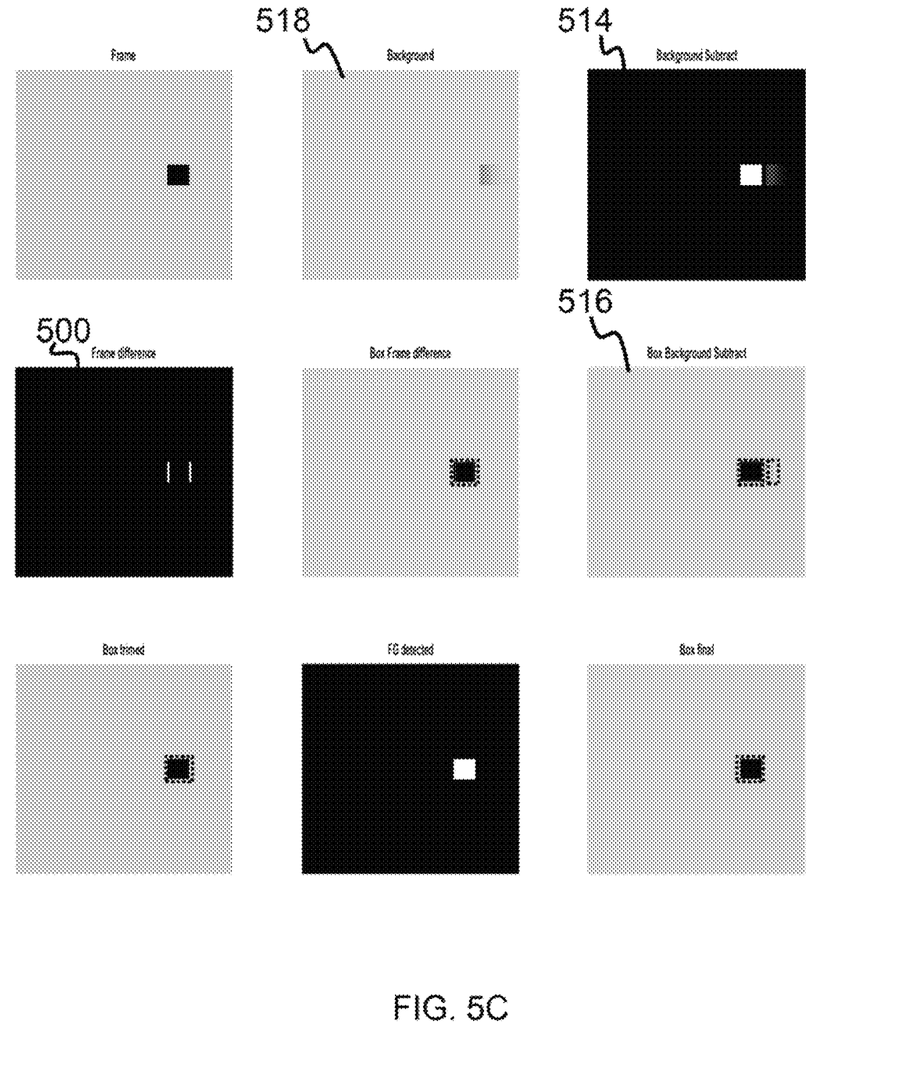
FIG. 5C is an illustration of the same object as shown in FIG. 5B, now at a given time lapse of t=20.
Figure 5D:
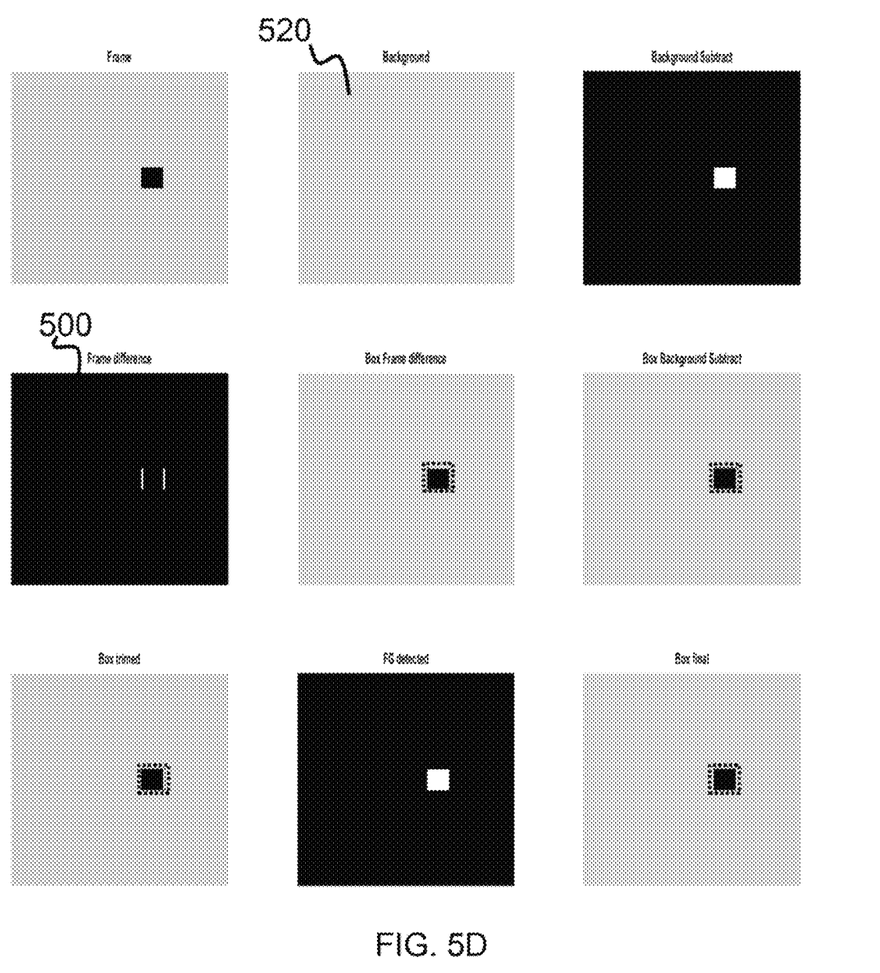
FIG. 5D is an illustration of the same object as shown in FIG. 5C, now at a given time lapse of t=30.

To system described herein was reduced to practice to demonstrate its efficiency and robustness, with results depicted in FIGS. 5A through 5D. In the figures, the plot Frame denotes the current image frame, background denotes the model background, background subtraction denotes the difference map of Frame and Background, frame difference denotes the difference map of two most recent consecutive frames, box frame difference denotes the bounding boxes (in dashed lines) of objects on the frame difference map, box background subtraction denotes the bounding boxes (in dashed lines) of object pixels on the augmented background subtraction map, box trimmed denotes the trimmed boxes (in dashed lines), FG detected denotes the detected foreground object pixels, and box final denotes the bounding boxes (in dashed lines) of detected foreground objects. In FIG. 5A, which depicts the process at t=1, the model background is the same as the initial frame at t=0. Since the object is moving very slow, the detected foreground pixels are only a little part of the object. In FIG. 5B, which depicts the process at t=10, the entire object can be detected, with majority ghost pixels on the background subtraction map being removed by the box trim algorithm. However, a small portion of ghost pixels are still left. This is made apparent by the small difference between the real object (in black) and the bounding boxes (in dashed lines) of detected foregrounds on the plot box final. In FIG. 5C, depicting the process at t=20, the exact moving object body is detected, with the small portion of ghost pixels attached after the real object is removed. In FIG. 5D, which demonstrates the process at t=30, the model background map is clean without any moving object trace left. These figures are described in further detail below.

FIGS. 5A through 5D present a very challenging case for moving object detection, since the object is not only moving slowly, but also has a uniform color (black). As a result, simply taking the difference of two consecutive frames only gives a little part of the object body (see the plot Frame difference 500 in FIGS. 5A through 5D). Since there is not much information at the beginning, only a little part of the object body can be detected at time t=1, as shown on the plot FG detected (detected moving foreground) 502 in FIG. 5A. However, through time at t=10, the entire body of the moving object can already be detected (see the FG detected map 504 in FIG. 5B). Note that the foreground pixels in the FG detected map 504 are much neater than those in the Background Subtraction map 506. This fact is owing to the "box trim" algorithm, which trimmed out obsolete ghost foreground pixels. See the dashed boxes 510 in the Box background subtraction map 508 and Box trimmed map 510 for the box trim process.

At this stage, sparse ghost pixels are left in the detected foreground map. This can be seen from the small difference between the detected foreground bounding box (in dashed lines) and the real object (in black) on the plot Box final 512 in FIG. 5B. This small portion of the ghost pixels will be removed at time t=20, as shown in FIG. 5C. Note that the algorithm also removes a separate part of ghost object pixels left behind by the real object (see plots Background subtraction 514 and Box background subtraction 516). By t=20, it is possible to detect the extracted moving object pixels as belonging to the foreground, even though there is still a weak object footprint left in the model background map (see the plot Background 518 in the FIG. 5C).

A clean model background 520 will be available by time t=30 (see FIG. 5D). In the simulation, the weight w=0.3 has been chosen (see Eq. 2). What was demonstrated here is a very hard case, so it takes some time to detect all the pixels of the moving object. For most real objects, the problem is not so great, since they are often textured with non-uniform colors.

(4.5) Test on Real Videos

Figure 6:
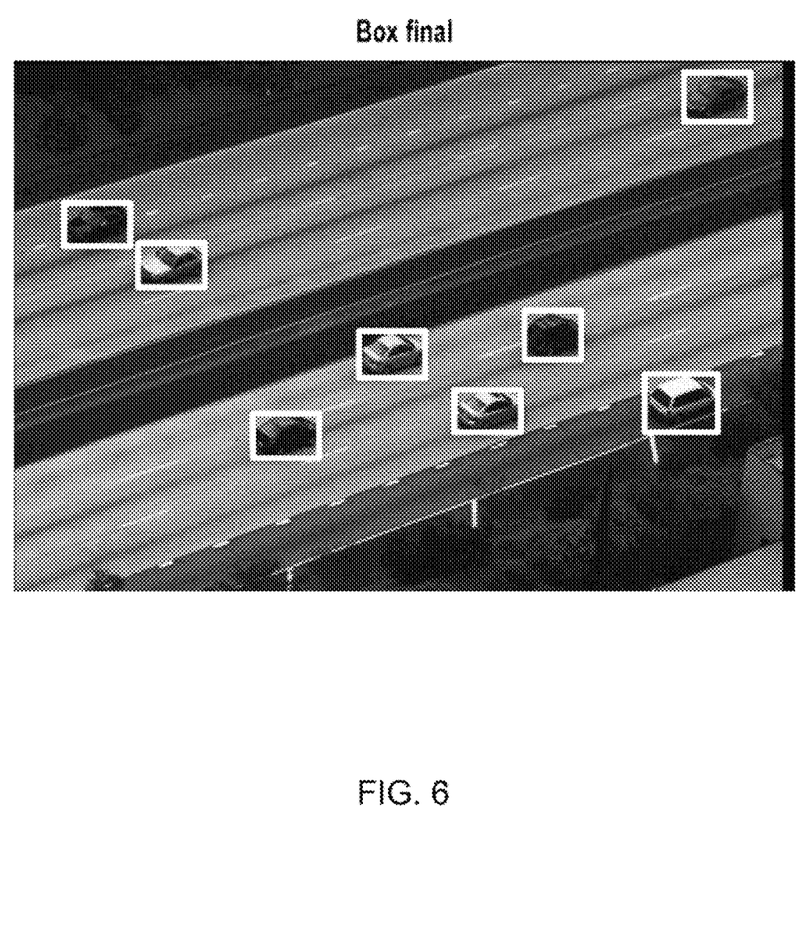
FIG. 6 is a still frame taken from the footage resulting from a live demonstration a system according to an embodiment of the present invention.

To further demonstrate efficiency and robustness, the system was tested on helicopter videos, as shown in FIG. 6. The helicopter video was taken by a moving camera, in which the scenes were changing constantly with the new background and foreground pixels in each new frame. As a result, a basic background subtraction model will create a lot of ghost objects. FIG. 6 shows the detection results using the system of this disclosure. These results show that the "Box trim" algorithm correctly detected moving objects, without creating any ghost objects.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for, ghost removal in video footage, the system comprising:
   one or more processors and, a memory, the memory being a non-transitory computer-readable medium having executable instructions encoded thereon, such that, upon execution of the instructions, the one or more processors perform operations of:
   generating a background subtraction map;
   generating an original bounding box that surrounds a detected foreground object through background subtraction;
   generating a detected foreground map, the detected foreground map having at least two detected foreground (DF) bounding boxes of detected foregrounds obtained by a difference of two consecutive frames in video footage; and
   trimming the original bounding box into a trimmed box, the trimmed box being a smallest box that contains the at least two DF bounding boxes, wherein the trimmed box is ghost free and designated as containing a real-world object.

2. The system as set forth in claim 1, further comprising an operation of tracking the real-world object through successive image frames based on the trimmed box.

3. The system as set forth in claim 2, wherein the background subtraction map is obtained from a difference between a current image frame and a model background map.

4. The system as set forth in claim 3, wherein the model background map is initialized from an initial image frame and thereafter updated with a weighted combination of a former model background map and the current image, wherein regions of the current image corresponding to interiors of trimmed boxes in the detected foreground map are provided a weighting in this combination that is less than regions outside the trimmed boxes.

5. The system as set forth in claim 4, wherein the video footage is obtained from a moving camera, causing new regions of a scene to come into the current image with each, frame, wherein the model background map is shifted in accord with a determined camera ego-motion to generate a shifted model background map, and then any regions oldie shifted model background map that contain no information are replaced with pixel values from the current image.

6. The system as set forth in claim 5, wherein each frame in the video footage has a frame size, and wherein the model background map is an expanded model background map that is a larger size than the frame size of the video footage, such that portions of the expanded model background map that are outside the frame when the model background map is updated are provided a reduced weighting in accord with a number of frames for which they are not updated, and wherein portions of the expanded model background map that, are shifted into the frame in accord with ego-motion are combined with the current image in accord with this weighting.

7. The system as set forth in claim 1, wherein the background subtraction map is obtained from a difference between a current image frame and a model background map.

8. The system as set forth in claim 7, wherein the model background map is initialized from an initial image frame and thereafter updated with a weighted combination of a former model background map and a current image, w herein regions of the current image corresponding to interiors of trimmed boxes in the detected foreground map are provided a weighting in this combination that is less than regions outside the trimmed boxes.

9. The system as set forth in claim 1, wherein the video footage is obtained from a moving camera, causing new regions of a scene to come into a current image with each frame, wherein the model background map is shifted in accord with a determined camera ego-motion to generate a shifted model background map, and then any regions of the shifted model background map that contain no information are replaced with pixel values from the current image.

10. The system as set forth in claim 1, wherein each frame in the video footage has a frame size, and wherein the model background map is an expanded model background map that is a larger size than the frame size of the video footage, such that portions of the expanded model background map that are outside the frame when the model background map is updated during an updating process are provided a reduced weighting in accord with a number of frames for which they are not updated, and wherein portions of the expanded model background map that are shifted into the frame in accord with ego-motion are combined with the current image in accord with this weighting.

11. A computer program product for ghost removal in video footage, the computer program product comprising:
   a non-transitory computer-readable medium having executable instructions encoded thereon, such that upon execution of the instructions by one or more processors, the one or more processors perform operations of:
   generating a background subtraction map;
   generating an original bounding box that surrounds a detected foreground object through background subtraction;
   generating a detected foreground map, the detected foreground map having at least two detected foreground (DF) bounding boxes of detected foregrounds obtained by a difference of two consecutive frames in video footage; and
   trimming the original bounding box into a trimmed box, the trimmed box being a smallest box that contains the at least two DF bounding boxes, wherein the trimmed box is ghost free and designated as containing a real-world object.

12. The computer program product as set forth in claim 11, further comprising instructions for causing one or more processors to perform an operation of tracking the real-world object through successive image frames based on the trimmed box.

13. The computer program product as set forth in claim 12, wherein the background subtraction map is obtained from a difference between a current image frame and a model background map.

14. The computer program product as set forth in claim 13, wherein the model background map is initialized from an initial image frame and thereafter updated with a weighted combination of a former model background map and the current image, wherein regions of the current image corresponding to interiors of trimmed boxes in the detected foreground map are provided a weighting in this combination that is less than regions outside the trimmed boxes.

15. The computer program product as set forth in claim 14, wherein the video footage is obtained from a moving camera, causing new regions of a scene to come into the current image with each frame, wherein the model background map is shifted in accord with a determined camera ego-motion to generate a shifted model background map, and then any regions of the shifted model background map that contain no information are replaced with, pixel values from the current image.

16. The computer program product as set forth in claim 15, wherein each frame in the video footage has a frame size, and wherein the model background map is an expanded model background map that is a larger size than the frame size of the video footage, such that portions of the expanded model background map that are outside the frame when the model background map is updated are provided a reduced weighting in accord with a number of frames for which they are not updated, and wherein, portions of the expanded model background map that are shifted into the frame in accord with ego-motion are combined with the current image in accord with this weighting.

17. The computer, program product as set forth in claim 11, wherein the background subtraction map is obtained from a difference between a current image frame and a model background map.

18. The computer program product as set forth in claim 17, wherein the model background map is initialized from an initial image frame and thereafter updated with a weighted combination of a former model background map and a current image, wherein regions of the current image corresponding to interiors of trimmed boxes in the detected foreground map, are provided a weighting in this combination that is less than regions outside the trimmed boxes.

19. The computer program product as set forth in claim 17, wherein the video footage is obtained from a moving camera, causing new regions of a scene to come into a current image with each frame, wherein the model background map is shifted in accord with a determined camera ego-motion to generate a shifted model background map, and then any regions of the shifted model background map that contain no information are replaced with pixel values from the current image.

20. The computer program product as, set forth in claim 17, wherein each frame in the video footage has a frame size, and wherein the model background map is an expanded model background map that is a larger size than the frame size of the video footage, such that portions of the expanded model background map that are, outside the frame when the model background map is updated during an updating process are provided a reduced weighting in accord with a number of frames for which they are not updated, and wherein portions of the expanded model background map that are shifted into the frame in accord with ego-motion are combined with the current image in accord with this weighting.

21. A method for ghost removal in video footage, the method comprising an act of:
causing one or more processors to execute instructions encoded on a non-transitory computer-readable medium, such that upon execution, the one or more processors perform operations of:
generating a background subtraction map;
generating an original bounding box that surrounds a detected foreground object through background subtraction;
generating a detected foreground map, the detected foreground map having at least two detected foreground (DF) bounding boxes of detected foregrounds obtained by a difference of two consecutive frames in video footage; and
trimming the original bounding box into a trimmed box, the trimmed box being a smallest box that contains the at least two DF bounding boxes, wherein the trimmed box is ghost free and designated as containing a real-world object.

22. The method as set forth in claim 21, further comprising an operation of tracking the real-world object through successive image frames based on the trimmed box.

23. The method as set forth in claim 21, wherein the background subtraction map is obtained from a difference between a current image frame and a model background map.

24. The method as set forth in claim 23, wherein the model background map is initialized from an initial image frame and thereafter updated with a weighted combination of a former model background map and a current image, wherein regions of the current image corresponding to interiors of trimmed boxes in the detected foreground map are provided a weighting in this combination that is less than regions outside the trimmed boxes.

25. The method as set forth in claim 23, wherein the video footage is obtained from a moving camera, causing new regions of a scene to come into a current image with each frame, wherein the model background map is shifted in accord with a determined camera ego-motion to generate a shifted model background map, and then any regions of the shifted model background map that contain no information are replaced with pixel values from the current image.

26. The method as set forth in claim 23, wherein each frame in the video footage has a frame size, and wherein the model background map is an expanded model background map that is, a larger size than the frame size of the video footage, such that portions of the expanded model background map that are outside the frame when the model background map is updated during an updating process are provided a reduced weighting in accord with a number of frames for which they are not updated, and wherein portions of the expanded model background map that are shifted into the frame in accord with ego-motion are combined with the current image in accord with this weighting.

* * * * *